(12) United States Patent
Vaccaro (10) Patent No.: US 9,616,602 B2
(45) Date of Patent: Apr. 11, 2017

(54) INTERCONNECTION SEAL

(71) Applicant: CommScope Technologies LLC, Hickory, NC (US)

(72) Inventor: Ronald A Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 448 days.

(21) Appl. No.: 13/938,475

(22) Filed: Jul. 10, 2013

(65) Prior Publication Data

US 2015/0017827 A1 Jan. 15, 2015

(51) Int. Cl.
*H01R 13/52* (2006.01)
*B29C 45/00* (2006.01)
*H02G 1/14* (2006.01)
B29K 83/00 (2006.01)
B29K 105/04 (2006.01)
B29L 31/00 (2006.01)
B29L 31/36 (2006.01)

(52) U.S. Cl.
CPC ........... *B29C 45/0001* (2013.01); *H02G 1/14* (2013.01); *B29K 2083/005* (2013.01); *B29K 2105/046* (2013.01); *B29L 2031/36* (2013.01); *B29L 2031/7278* (2013.01); *Y10T 29/49176* (2015.01)

(58) Field of Classification Search
CPC .... H01R 11/281; H01R 4/74; H01R 2103/00; H01R 13/5219; H01R 13/5221; H01R 13/5208; H01R 13/5205; H02G 3/22
USPC ................ 439/519, 523, 578, 271–275, 279; 174/74 R, 138 F, 650
See application file for complete search history.

(56) References Cited

U.S. PATENT DOCUMENTS

| | | | | |
|---|---|---|---|---|
| 2,517,693 A | * | 8/1950 | Mead | F16L 5/10 174/152 G |
| 2,517,717 A | * | 8/1950 | Rose | F16L 5/10 174/152 G |
| 2,946,839 A | | 2/1959 | Horning | |

(Continued)

FOREIGN PATENT DOCUMENTS

| | | |
|---|---|---|
| JP | 4482668 | 6/2010 |
| KR | 1020100010333 | 2/2010 |

OTHER PUBLICATIONS

Jai Neon Jeong, International Search Report for application PCT/US2014/040457, 22 Sep. 2014, Korean Intellectual Property Office, Daejeon Metropolitan City, Republic of Korea.

*Primary Examiner* — Amy Cohen Johnson
*Assistant Examiner* — Milagros Jeancharles
(74) *Attorney, Agent, or Firm* — Myers Bigel, P.A.

(57) ABSTRACT

A seal for a cable and connector interconnection includes a unitary elastic body with a bore therethrough. The bore is provided with a cable outer diameter seal portion at a cable end, the cable outer diameter seal portion adjacent a connector cavity portion, the connector cavity portion adjacent a coupling nut cavity portion, and the coupling nut cavity portion adjacent a connector neck seal portion with a bulkhead seal at a connector end. The coupling nut cavity portion is longitudinally aligned with a coupling nut of the connector and is provided with a greater inner diameter than the cable outer diameter seal portion and the connector neck seal portion. The bulk head seal is provided with an outer diameter greater than an outer diameter of the connector neck seal portion.

18 Claims, 8 Drawing Sheets

(56) References Cited

U.S. PATENT DOCUMENTS

| | | | | |
|---|---|---|---|---|
| 3,056,852 A * | 10/1962 | Sachs | | H01R 13/585 |
| | | | | 16/2.5 |
| 3,390,375 A | 6/1968 | Salmonson | | |
| 3,528,051 A | 9/1970 | Toedtman et al. | | |
| 3,753,192 A | 8/1973 | Urani | | |
| 3,861,777 A | 1/1975 | Clark | | |
| 4,084,066 A | 4/1978 | Gillemot | | |
| 4,173,385 A | 11/1979 | Fenn et al. | | |
| 4,224,464 A | 9/1980 | Bunnell et al. | | |
| 4,234,757 A * | 11/1980 | Simons | | H02G 15/068 |
| | | | | 174/73.1 |
| 4,283,597 A | 8/1981 | Cooper, Jr. | | |
| 4,325,600 A | 4/1982 | Nestor | | |
| 4,593,962 A | 6/1986 | Knorreck et al. | | |
| 4,822,293 A | 4/1989 | Robson | | |
| 4,880,676 A | 11/1989 | Puigcerver et al. | | |
| 5,132,495 A | 7/1992 | Ewing et al. | | |
| 5,280,136 A * | 1/1994 | Yaworski | | H02G 15/068 |
| | | | | 174/73.1 |
| 5,502,280 A | 3/1996 | Rocci et al. | | |
| 5,631,443 A | 5/1997 | Scrimpshire et al. | | |
| 5,816,853 A | 10/1998 | Buekers et al. | | |
| 5,857,865 A | 1/1999 | Shimirak et al. | | |
| 5,886,294 A * | 3/1999 | Scrimpshire | | G02B 6/3887 |
| | | | | 174/359 |
| 5,902,963 A * | 5/1999 | Chappaz | | H01B 19/00 |
| | | | | 174/167 |
| 6,273,733 B1 | 8/2001 | Uchiyama | | |
| 6,429,373 B1 | 8/2002 | Scrimpshire et al. | | |
| 6,482,017 B1 | 11/2002 | Van Doorn | | |
| 6,929,265 B2 | 8/2005 | Holland et al. | | |
| 6,942,520 B2 | 9/2005 | Barlian et al. | | |
| 6,955,558 B1 | 10/2005 | Low et al. | | |
| 7,179,100 B2 | 2/2007 | Montena | | |
| 7,407,412 B2 | 8/2008 | Khemakhem | | |
| 7,453,042 B2 | 11/2008 | Low et al. | | |
| 7,674,121 B2 | 3/2010 | Khemakhem | | |
| 7,767,908 B2 * | 8/2010 | Sylvan | | F16L 5/10 |
| | | | | 174/72 A |
| 7,798,847 B2 * | 9/2010 | Islam | | 439/578 |
| 7,838,775 B2 | 11/2010 | Montena | | |
| 7,909,635 B2 | 3/2011 | Hughes et al. | | |
| 7,942,694 B2 * | 5/2011 | Amidon | | 439/578 |
| 8,016,605 B2 * | 9/2011 | Montena | | H01R 13/622 |
| | | | | 439/322 |
| 8,016,612 B2 * | 9/2011 | Burris | | H01R 9/05 |
| | | | | 439/578 |
| 8,152,547 B2 | 4/2012 | Hughes | | |
| D680,081 S * | 4/2013 | Yamauchi | | D13/156 |
| 2003/0024717 A1 | 2/2003 | Knighten et al. | | |
| 2004/0245730 A1 | 12/2004 | Holland et al. | | |
| 2010/0248533 A1 | 9/2010 | Montena | | |

* cited by examiner

INTERCONNECTION SEAL

BACKGROUND

Field of the Invention

The invention relates to a device for environmentally sealing and securing the interconnection between cables and/or apparatus, for example between feed and/or control cables interconnected with an apparatus or enclosure.

Description of Related Art

Electrical interconnections are subject to degradation from environmental factors such as moisture, vibration and repeated expansion and contraction from daily temperature changes.

Environmental seals, such as outer sealing enclosures that surround an electrical interconnection, have been used, for example, to surround a cable end connector to cable end connector interconnection.

The prior enclosures typically apply rigid clamshell configurations which, once closed, may be difficult to open, especially when installed in exposed locations such as atop radio towers. Gaskets may be applied at the enclosure ends and/or along a sealing perimeter of the shell. Gel seals are typically not re-usable and/or have only a limited number of re-uses before they must be replaced.

Connections to an apparatus, such as an antenna, are typically made to a connector body or other connection assembly mounted to an exterior surface of the antenna. Because the connector body or other connection assembly is typically a bulkhead type, flush against a surface, a cable-to-cable interconnection sealing assembly that tapers at either end to the same cable diameter is unusable.

Elastic body interconnection seals are also known. For example, U.S. Pat. No. 6,429,373, titled "Multipurpose Flexible Cable Boot for Enclosing Trunk and Feeder Cable Connectors", issued 6 Aug. 2002, discloses a seal of flexible material, with a connector end shoulder with a seal ring portion dimensioned to seal against a cylindrical connection point of an apparatus. However, the seal ring has minimal longitudinal extent for sealing contact with the apparatus and the seal is dimensioned to enclose the connector within a cylindrical cavity dimensioned with respect to the largest diameter of the connector, forming a significant enclosed area for moisture to pool within, should leakage occur.

U.S. Pat. No. 7,453,042, titled "Cable and Apparatus Interconnection Close Quarters Environmental Seal", issued 18 Nov. 2008, discloses a seal with a unitary rubber and/or elastomer body cylindrical gasket with a C-shaped outer shell closed by an additional retaining means. The interconnection may be placed into the outer shell and the outer shell then sealed around it, via the retaining means. Such a configuration enables sealing along neck portions of standardized connection interfaces. However, the seal area along the periphery of the C-shaped body is extensive, which may degrade the long term performance of the resulting seal.

Competition within the electrical interface environmental seal industry has focused attention on reliability, re-usability, ease of use, improved temperature range capabilities and overall reductions in manufacturing and installation costs.

Therefore, it is an object of the invention to provide a device that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

As shown for example in FIGS. 1-19, a seal has a unitary elastic body 3 with a bore 5 therethrough. Sequenced from a cable end 7 to a connector end 9, the bore 5 has: (a) a cable outer diameter seal portion 11 at the cable end 7; (b) the cable outer diameter seal portion 11 adjacent a connector cavity portion 13; (c) the connector cavity portion 13 adjacent a coupling nut cavity portion 15; (d) the coupling nut cavity portion 15 adjacent a connector neck seal portion 17 and (e) a bulkhead seal (20) adjacent the connector neck seal portion 17, at the connector end 9.

One skilled in the art will appreciate that cable end 7 and connector end 9 are provided as position references for both the interconnection and individual elements of the connector and seal portions along a longitudinal axis of the interconnection 10. Therefore, each element identified has both a cable end 7 and a connector end 9, these being the sides of each element closest to the cable end 7 and the connector end 9 of the interconnection 10, along the longitudinal axis of the interconnection 10.

The connector neck seal portion 17 is configured to seal against the neck portion 21 of the connector interface 23, for example, that a coupling nut 25 of the connector 19 is threaded upon. The connector interface 23 may be provided as a bulkhead type connection point, as shown for example in FIGS. 9 and 13, which includes a bulkhead surface 22 transverse to the longitudinal axis of the connection interface 23. The coupling nut cavity portion 15 is provided with a greater inner diameter than the connector neck seal portion 17. Thereby, the coupling nut cavity portion 15 can surround the coupling nut 25 and the connector neck seal portion 17 can engage and seal against the neck 21 of the selected connector interface 23, without requiring a non-standard connection interface with an increased connector neck diameter.

Figure 9:
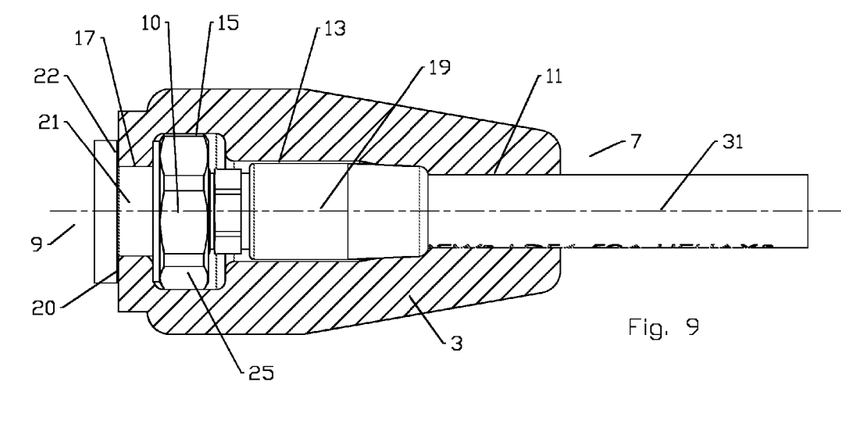
FIG. 9 is a schematic cut-away view of the interconnection seal of FIG. 7, mounted upon a bulkhead and connector terminated cable interconnection, taken along line A-A of FIG. 8.
Figure 10:
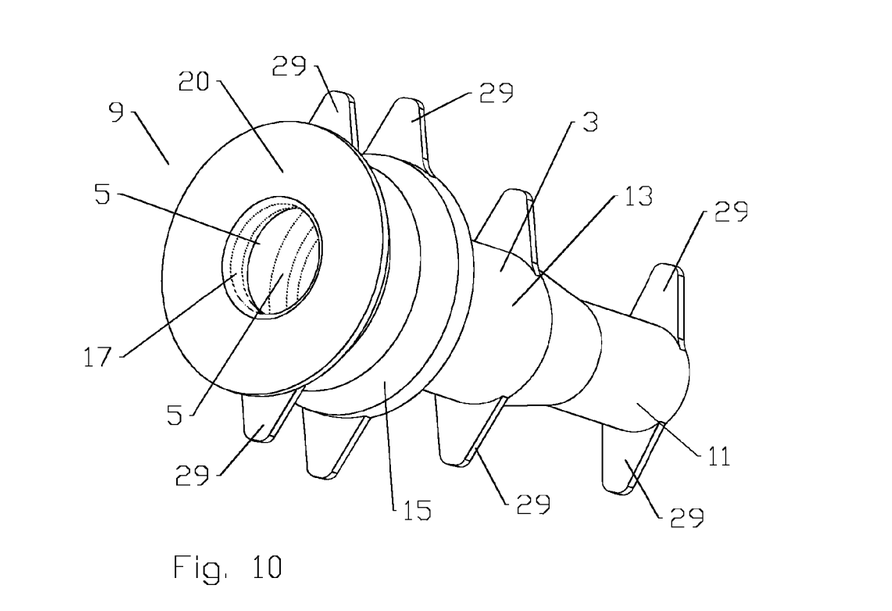
FIG. 10 is a schematic isometric view of another alternative embodiment of an interconnection seal, with a plurality of grip tabs.
Figure 11:
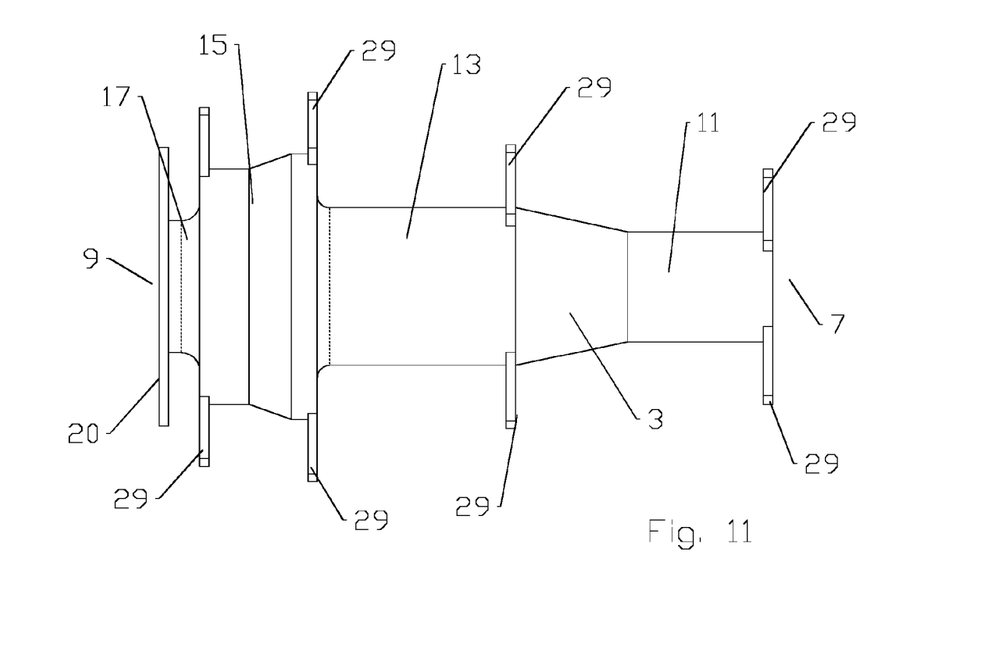
FIG. 11 is a schematic side view of the interconnection seal of FIG. 10.
Figure 12:
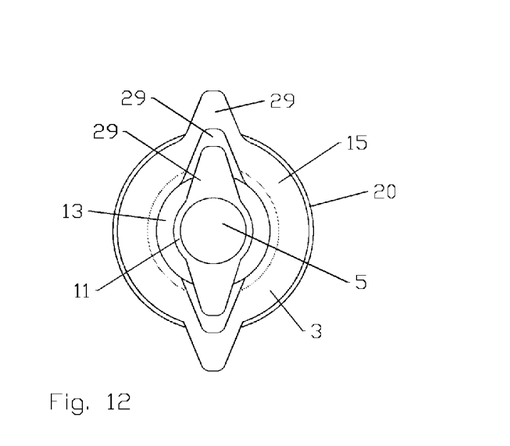
FIG. 12 is a schematic cable end view of the interconnection seal of FIG. 10.
Figure 13:
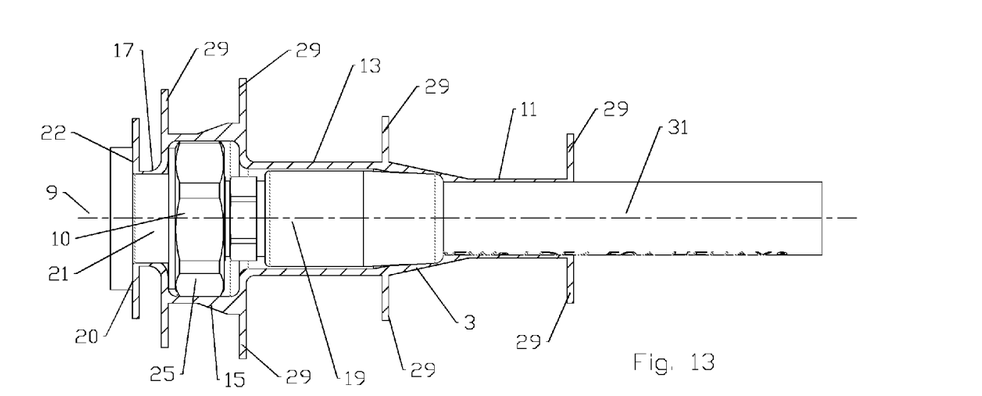
FIG. 13 is a schematic cut-away view of the interconnection seal of FIG. 11, mounted upon a bulkhead and connector terminated cable interconnection.
Figure 14:
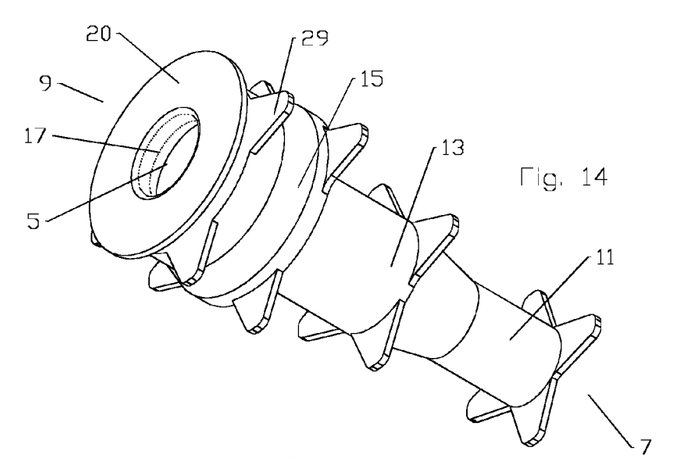
FIG. 14 is a schematic isometric view of another alternative embodiment of an interconnection seal, with a plurality of grip tabs.
Figure 15:
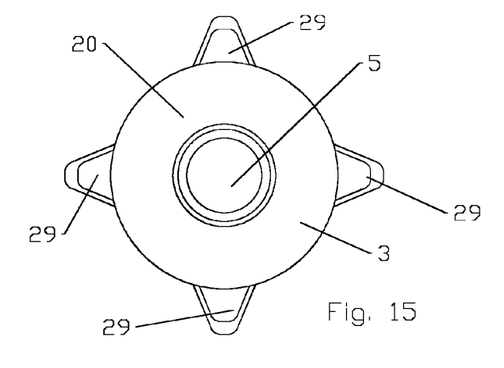
FIG. 15 is a schematic connector end view of the interconnection seal of FIG. 14.
Figure 16:
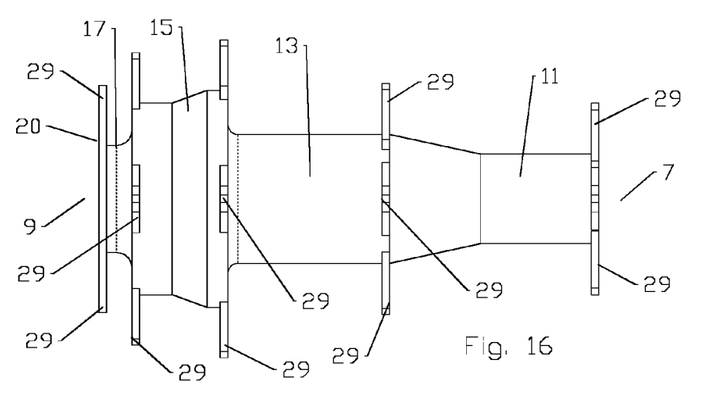
FIG. 16 is a schematic side view of the interconnection seal of FIG. 14.

One skilled in the art will appreciate that the connector neck seal portion 17, extending between the coupling nut 25 and the bulkhead surface 22, provides an extended surface for the connector neck seal portion 17 to seal against, which may improve the resulting seal. Further, a connector end of the connector neck seal portion 17 which transitions into the bulkhead seal 20 provides a ready pull surface for momentarily stretching the connector neck seal portion 17 over the coupling nut 25 during installation and then aligning the connector neck seal portion 17 into position. The bulkhead seal 20 also provides additional seal surface area and may further operate to bias the connector neck seal portion 17, between the cable end of the coupling nut 25 and the bulkhead surface 22, into sealing engagement with the neck 21. For ease of grip, the bulkhead seal 20 may be provided with an outer diameter greater than an outer diameter of the connector neck seal portion 17, for example equal to or greater than an outer diameter of the coupling nut cavity portion 15.

Figure 1:
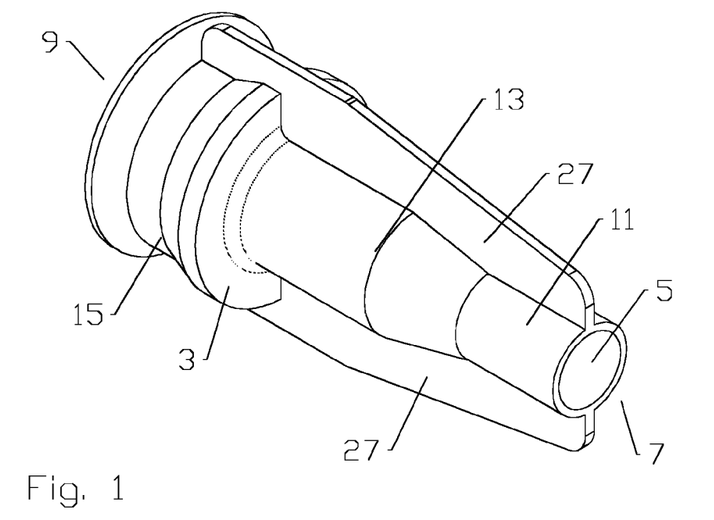
FIG. 1 is a schematic isometric view of an exemplary interconnection seal.
Figure 2:
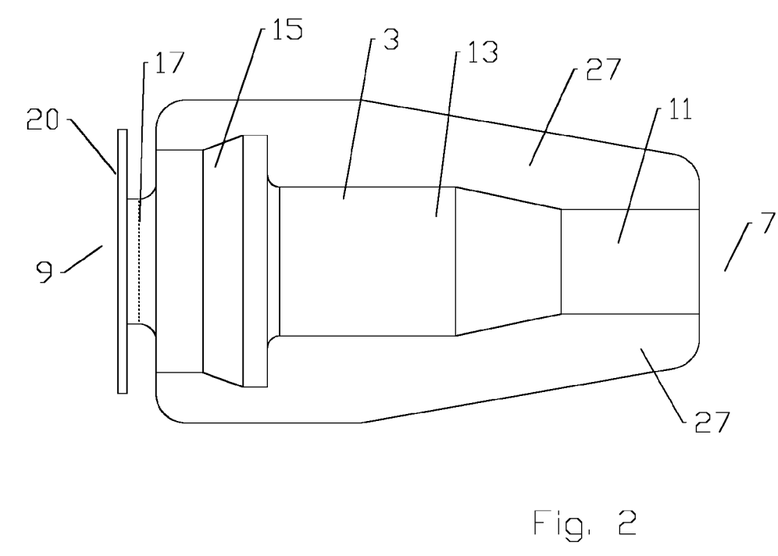
FIG. 2 is a schematic side view of the interconnection seal of FIG. 1.
Figures 3, 4, 5:
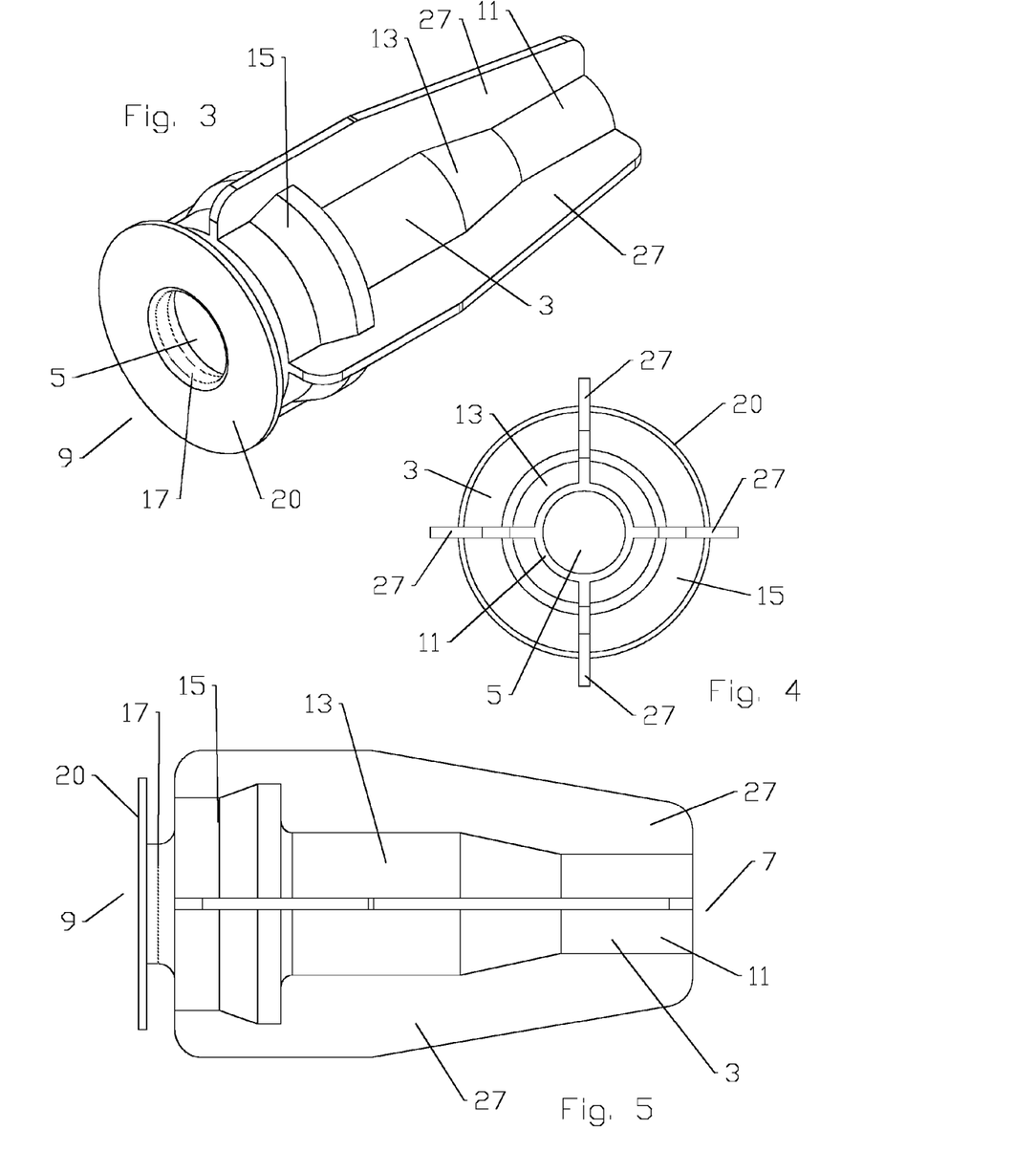
FIG. 3 is a schematic isometric view of an alternative embodiment of an interconnection seal.
FIG. 4 is a schematic cable end view of the interconnection seal of FIG. 3.
FIG. 5 is a schematic side view of the interconnection seal of FIG. 3.
Figure 6:
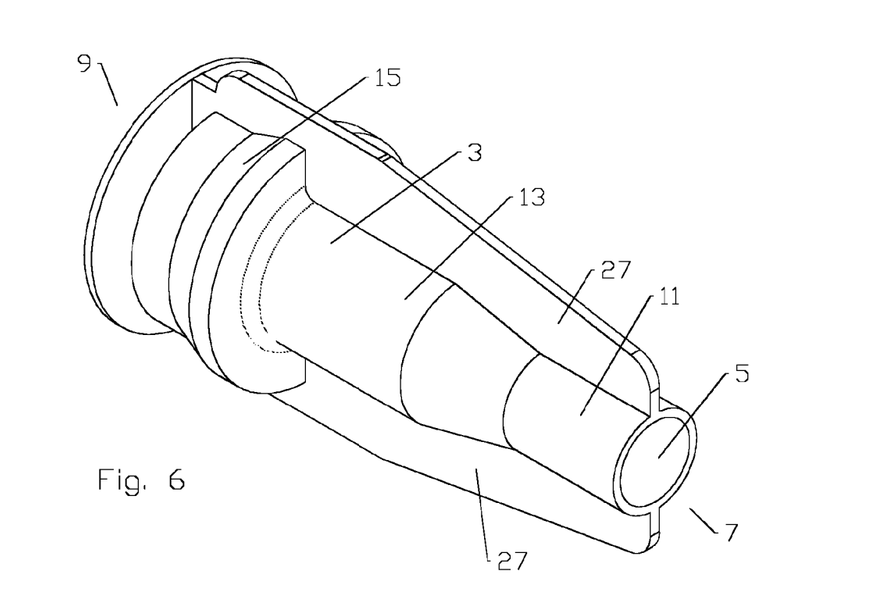
FIG. 6 is a schematic isometric view of another alternative embodiment of an interconnection seal, with a grip rib extending between the cable and connector ends of the interconnection seal.
Figure 7:
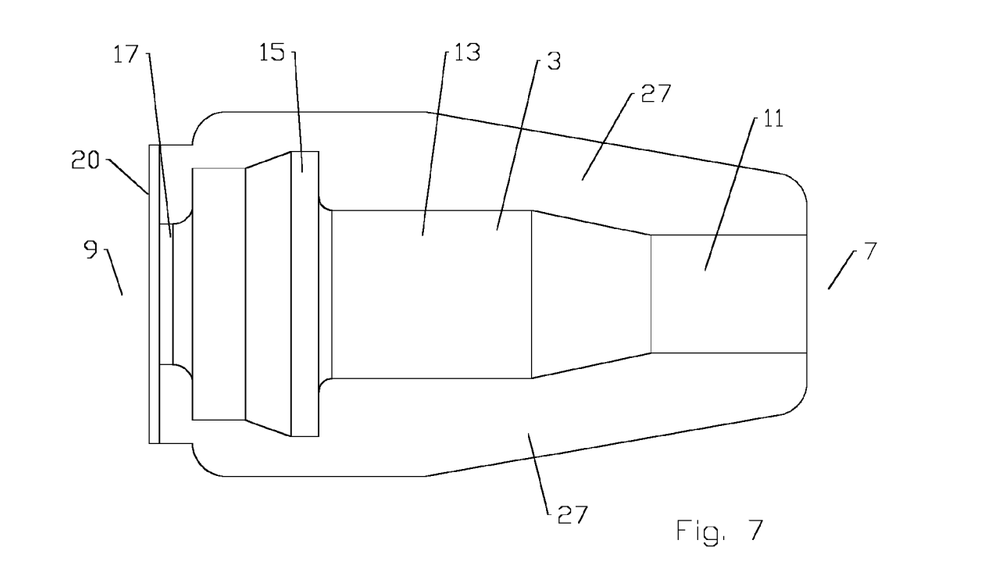
FIG. 7 is a schematic side view of the interconnection seal of FIG. 6.
Figure 8:
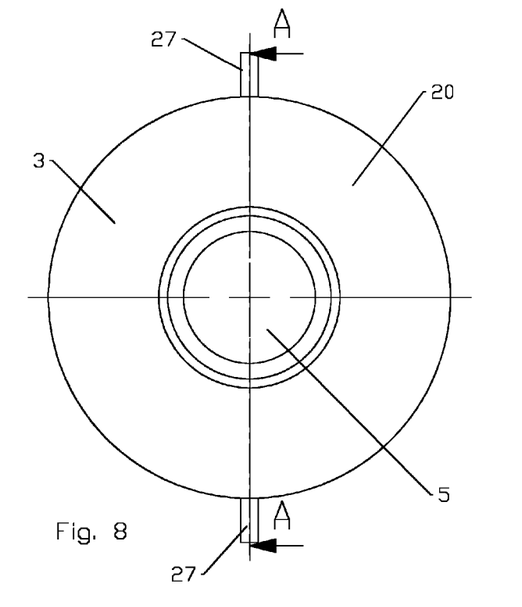
FIG. 8 is a schematic connector end view of the interconnection seal of FIG. 6.

Additional exterior surface features may be applied to reinforce the seal and/or provide grip surfaces for pulling the seal over the interconnection 10 and into the longitudinally aligned sealing position. For example as shown in FIGS. 1-5, a plurality of grip fins 27 may be provided protruding radially from an outer diameter of the seal. The grip fins 27 may be aligned parallel to a longitudinal axis of the seal, extending, for example, between the cable end 7 of the seal and a connector end of the coupling nut cavity portion 15. Alternatively, the grip fins may extend between the cable and connector ends of the seal, for example as shown in FIGS. 6-9.

Where two grip fins 27 are applied, the grip fins 27 may be aligned at opposing sides along a longitudinal cross section of the seal, as shown for example in FIGS. 1 and 2. Where four grip fins 27 are applied, the grip fins 27 may be arrayed around a circumference of the seal equidistant from one another, for example as shown in FIGS. 3-5.

As shown for example in FIGS. 10-16, the exterior surface features may also be applied as grip tabs 29 protruding radially from seal, aligned, for example, transverse to the longitudinal axis. The grip tabs 29 may be applied, for example, proximate the cable end 7, the connector cavity portion 13, a cable end of the coupling nut cavity portion 15 and/or a connector end of the coupling nut cavity portion 15.

The grip tabs 29 may be aligned at opposing sides of the seal and/or arrayed around a circumference of the seal equidistant from one another.

Figures 17, 18:
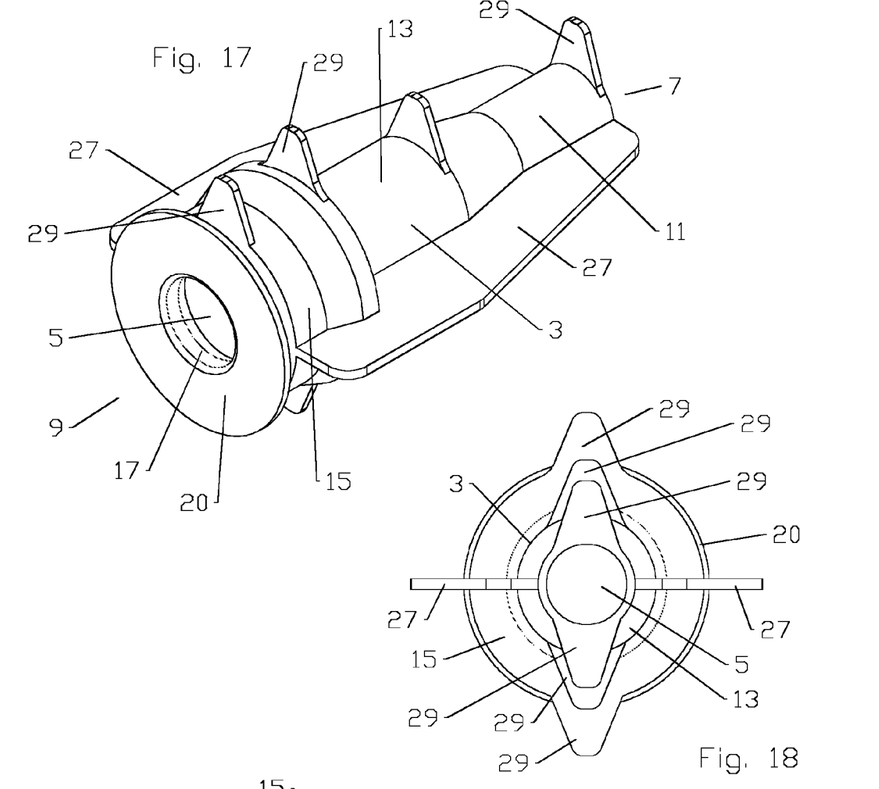
FIG. 17 is a schematic isometric view of another alternative embodiment of an interconnection seal, with a plurality of grip ribs and grip tabs.
FIG. 18 is a schematic connector end view of the interconnection seal of FIG. 16.
Figure 19:
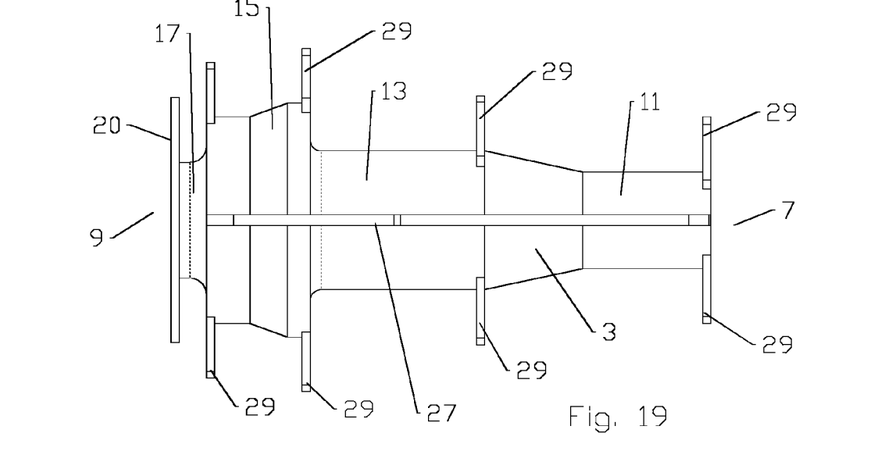
FIG. 19 is a schematic side view of the interconnection seal of FIG. 16.

Grip tabs 29 may also be combined with grip fins 27, for example as shown in FIGS. 17-19.

The body 3 may be formed from a unitary portion of material with an elastic characteristic such as injection molded silicone rubber, thermoplastic elastomers, molded closed-cell foam or the like having suitable sealing, environmental resistance and stability characteristics. Thereby, the body 3 has suitable rigidity to maintain the dimensions of the several portions prior to use while also being provided with an elastic property enabling at least the connector neck seal portion 17 to be stretched over the coupling nut 25 of the connector 19 during installation of the seal over the interconnection 10, so that the coupling nut cavity portion 15 is longitudinally aligned with the coupling nut 25 of the connector 19.

The cable outer diameter seal portion 11 and/or connector neck seal portion 17 may be provided with a smooth cylindrical inner sidewall. Thereby, the contact area between the cable outer diameter seal portion 11 and the outer diameter of the cable 31 and/or between the connector neck seal portion 17 and a neck 21 of the connector interface 23 is maximized, so that the seal therebetween has the largest possible contact area to resist leakage, and any leakage that does occur is not provided with areas within which liquid may pool along the extent of the respective sealing surfaces. Further, the close contact between the seal and the interconnection along the length of the interconnection minimizes formation of any cavities within the seal where moisture may pool over time, for example via condensation.

To install a seal over a cable and connector interconnection 10, the body 3 may be applied over the cable 31 and advanced away from the end of the cable prior to attaching the connector 19 thereto. Alternatively, the body 3 may be stretched to enable insertion of the connector 19 with the cable 31 already attached through the bore 5. Once the connector 19 is coupled to the desired connection interface 23, such as the bulkhead connector of an antenna or the like (see FIGS. 9 and 13), the connector neck seal portion 17 may be stretched over the coupling nut 25 of the connector 19 to seal against the neck 21 of the connection interface 23 and the bulkhead seal 20 against the bulkhead surface 22, if present. Thereby the interconnection of the cable 31 to the connection interface 23 is environmentally sealed both at the cable to connector interconnection and also at the connector to connector interface interconnection via a single body 3.

The presence of the grip fins 27 and or grip tabs 29 may assist the stretching of the seal for installation and/or removal by providing ready grip surfaces as each portion of the seal is advanced over the interconnection 10. Because the grip fins 27 and/or grip tabs 29 have a limited circumferential extent, they do not inhibit deformation of the various portions of the seal for momentary stretching/advancement over the interconnection 10.

One skilled in the art will appreciate that the relative dimensions of the cable 31 and, for example, connector 19 with respect to the terminating connection interface 23 are exemplary, only. Alternatively, a larger cable and corresponding connector may terminate upon a comparatively small connection interface 23.

The body 3 may be manufactured, for example by injection molding, from one of a liquid injection molded silicone rubber, liquid silicone rubber, thermoplastic elastomer and molded closed-cell foam. Elastic properties of these materials may enable molding without utilizing cost prohibitive collapsing core mold portions. Further, aligning the grip fins 27 and/or grip tabs 29 with the mold separation plane may simplify mold separation and/or minimize the appearance of any edge flash that may be present.

From the foregoing, it will be apparent that the seals bring to the art an improved seal useful, for example, for re-usable sealing of bulkhead type interconnections of standard connector interfaces. The resulting seals may further enable significant manufacturing and/or installation efficiencies.

| Table of Parts | |
|---|---|
| 3 | body |
| 5 | bore |
| 7 | cable end |
| 9 | connector end |
| 10 | interconnection |
| 11 | cable outer diameter seal portion |
| 13 | connector cavity portion |
| 15 | coupling nut cavity portion |
| 17 | connector neck seal portion |
| 19 | connector |
| 20 | bulkhead seal |
| 21 | neck |
| 22 | bulkhead surface |
| 23 | connector interface |
| 25 | coupling nut |
| 27 | grip fin |
| 29 | grip tab |
| 31 | cable |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A seal for a cable and connector interconnection, comprising:
    a unitary elastic body with a bore therethrough;
    the bore provided with a cable outer diameter seal portion at a cable end, the cable outer diameter seal portion adjacent a connector cavity portion, the connector cavity portion adjacent a coupling nut cavity portion, the coupling nut cavity portion adjacent a connector neck seal portion and a bulkhead seal provided at a connector end;
    the coupling nut cavity portion longitudinally aligned with a coupling nut of the connector and provided with a greater inner diameter than the connector neck seal portion; and
    the bulkhead seal provided with an outer diameter greater than an outer diameter of the connector neck seal portion;
    the seal further comprising a plurality of longitudinally-extending grip fins protruding radially from an outer diameter of the body, the grip fins defining an outer diameter greater than the outer diameter of the bulkhead seal.

2. The seal of claim 1, wherein two of the grip fins are aligned at opposing sides along a longitudinal cross section of the seal.

3. The seal of claim 1, wherein the plurality of grip fins is four grip fins, the grip fins arrayed around the body of the seal equidistant from one another.

4. The seal of claim 1, further including grip tabs protruding radially from the seal, the grip tabs aligned transverse to a longitudinal axis of the seal.

5. The seal of claim 4, wherein the grip tabs are proximate one of the cable end, the connector cavity portion, a cable end of the coupling nut cavity portion and a connector end of the coupling nut cavity portion.

6. The seal of claim 5, wherein there are two grip tabs at opposing sides of the seal proximate one of the connector cavity portion, the cable end of the coupling nut cavity portion and the connector end of the coupling nut cavity portion.

7. The seal of claim 5, wherein there are four grip tabs arrayed around a circumference of the seal equidistant from one another proximate one of the connector cavity portion, the cable end of the coupling nut cavity portion and the connector end of the coupling nut cavity portion.

8. The seal of claim 1, wherein the outer diameter of the bulkhead seal is equal to or greater than an outer diameter of the coupling nut cavity portion.

9. The seal of claim 1, wherein the cable outer diameter seal portion is provided with a smooth cylindrical inner sidewall.

10. The seal of claim 1, wherein the coupling nut cavity portion is provided with a greater inner diameter than the cable outer diameter seal portion.

11. The seal of claim 1, wherein the connector cavity portion is provided with a single inner diameter between the cable outer diameter seal portion and the coupling nut cavity portion.

12. The seal of claim 1, wherein the body is self supporting, maintaining a dimension of the cable outer diameter seal portion, the connector cavity portion and the coupling nut cavity portion prior to installation.

13. A method for sealing an interconnection between a cable terminated by a connector and a bulkhead connector, comprising the steps of:
    providing a seal as defined in claim 1;
    inserting the cable through the bore;
    interconnecting the connector and the bulkhead connector to form a connector to bulkhead connector interconnection;
    pulling two of the grip fins in opposite directions to stretch the seal; and
    positioning the stretched seal over the connector and bulkhead connector interconnection, the coupling nut cavity portion longitudinally aligned with a coupling nut of the connector, the connector neck seal portion sealing against a neck of the bulkhead connector and the bulkhead seal abutting a bulkhead portion of the bulkhead connector.

14. A seal for a cable and connector interconnection, comprising:
    a unitary elastic body with a bore therethrough;
    the bore provided with a cable outer diameter seal portion at a cable end, the cable outer diameter seal portion adjacent a connector cavity portion, the connector cavity portion adjacent a coupling nut cavity portion, the coupling nut cavity portion adjacent a connector neck seal portion and a bulkhead seal provided at a connector end;

the coupling nut cavity portion longitudinally aligned with a coupling nut of the connector and provided with a greater inner diameter than the connector neck seal portion; and the bulkhead seal provided with an outer diameter greater than an outer diameter of the connector neck seal portion;

the seal further comprising a plurality of circumferentially discontinuous grip tabs positioned about a circumference of the body and protruding radially therefrom.

15. The seal of claim 14, wherein the grip tabs are proximate one of the cable end, the connector cavity portion, a cable end of the coupling nut cavity portion and a connector end of the coupling nut cavity portion.

16. The seal of claim 14, wherein there are two grip tabs at opposing sides of the seal proximate one of the connector cavity portion, the cable end of the coupling nut cavity portion and the connector end of the coupling nut cavity portion.

17. The seal of claim 14, wherein there are four grip tabs arrayed around a circumference of the seal equidistant from one another proximate one of the connector cavity portion, the cable end of the coupling nut cavity portion and the connector end of the coupling nut cavity portion.

18. A method for sealing an interconnection between a cable terminated by a connector and a bulkhead connector, comprising the steps of:
    providing a seal as defined in claim 14;
    inserting the cable through the bore;
    interconnecting the connector and the bulkhead connector to form a connector to bulkhead connector interconnection;
    pulling two of the grip tabs in opposite directions to stretch the seal; and
    positioning the stretched seal over the connector and bulkhead connector interconnection, the coupling nut cavity portion longitudinally aligned with a coupling nut of the connector, the connector neck seal portion sealing against a neck of the bulkhead connector and the bulkhead seal abutting a bulkhead portion of the bulkhead connector.

* * * * *

UNITED STATES PATENT AND TRADEMARK OFFICE
CERTIFICATE OF CORRECTION

PATENT NO. : 9,616,602 B2  
APPLICATION NO. : 13/938475  
DATED : April 11, 2017  
INVENTOR(S) : Vaccaro Page 1 of 1

It is certified that error appears in the above-identified patent and that said Letters Patent is hereby corrected as shown below:

On the Title Page

Item (56) References Cited, Other Publications:  
Please correct "Jai Neon Jeong, International Search Report"  
To read -- Jai Heon Jeong, International Search Report --

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*